No. 894,125. PATENTED JULY 21, 1908.
W. R. ELLIOTT.
PHOTOGRAPHIC VIEW FINDER.
APPLICATION FILED AUG. 13, 1906.
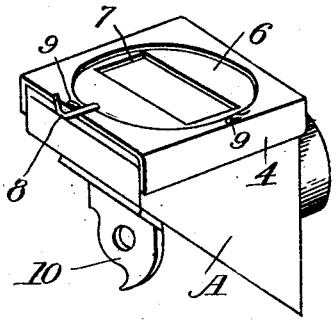
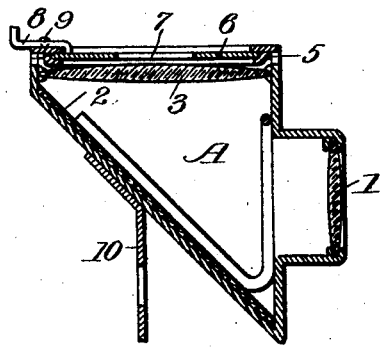
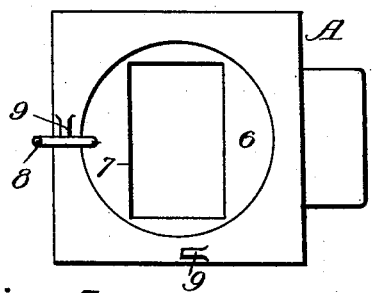
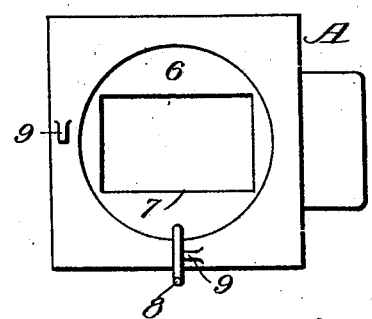
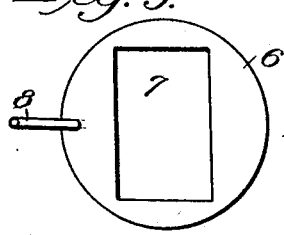
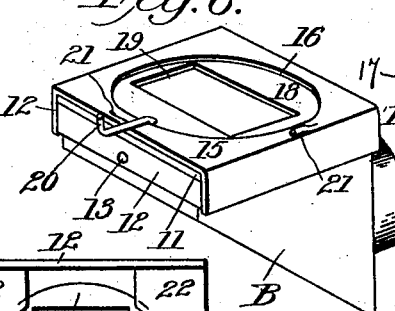
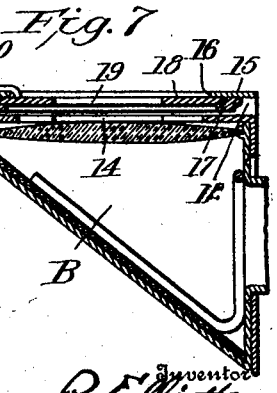
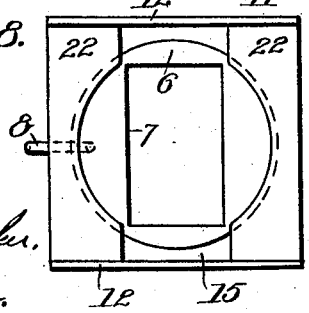

UNITED STATES PATENT OFFICE.

WAGGAMAN R. ELLIOTT, OF NEW ORLEANS, LOUISIANA.

PHOTOGRAPHIC VIEW-FINDER.

No. 894,125.

Specification of Letters Patent.

Patented July 21, 1908.

Application filed August 13, 1906. Serial No. 330,417.

*To all whom it may concern:*

Be it known that I, WAGGAMAN R. ELLIOTT, a citizen of the United States, residing at New Orleans, in the parish of Orleans and State of Louisiana, have invented certain new and useful Improvements in Photographic View-Finders, of which the following is a specification.

This invention relates to view-finders for photographic cameras and it has particular reference to that class of view-finders which are pivoted upon the camera box or casing so as to be capable of being turned to present the right side uppermost when the camera box is being turned for the purpose of taking a picture with the long side edges of the plate in a vertical or in a horizontal position, as the case may be. It is obvious that in view-finders of this class, if a rectangular view opening of dimensions proportionate to the plate is used, such view opening will fit only in one position of the camera and view-finder. If, on the other hand, the view aperture is made sufficiently large to take in the full view in either position of the camera and view-finder, the operator is compelled, in both positions, to eliminate portions of the view by guess work which is far from being accurate. View-finders have been made having view apertures formed in the shape of a cross including two rectangles of dimensions proportionate to the plate intersecting each other at right angles, but even with a view aperture of this shape the operator is obliged to mentally eliminate portions of the view in order to determine exactly what portions of the visible image will be included in the picture.

The present invention has for its object to provide a simply constructed device which may be readily attached to or detached from a camera and which will exhibit to the vision an image circumscribed by the precise dimensions of the plate, thus enabling the operator to perceive at a glance what will appear in the picture and nothing more.

With this and other ends in view which will readily appear as the nature of the invention is better understood the same consists essentially in the combination with a view-finder of a plate provided with a movable disk having a view aperture proportionate to the dimensions of the picture that is to be taken; said movable disk being capable of being shifted to proper position according to the position of the camera and view-finder and said plate and its attachments adapted to be detachably connected to the camera casing.

The invention further consists in the improved construction and novel arrangement and combination of parts which will be hereinafter fully described and particularly pointed out in the claims.

In the accompanying drawings has been illustrated a simple and preferred form of the invention.

In the drawings:—Figure 1 is a perspective view of a view-finder embodying the invention; Fig. 2 is a longitudinal sectional view of the same; Figs. 3 and 4 are top and plan views of the view-finder showing the disk having the view aperture in different positions; Fig. 5 is a detail plan view of the disk having the view aperture; Fig. 6 is a perspective view showing the invention embodied in an attachment to an ordinary view-finder; Fig. 7 is a transverse sectional view of said attachment; and Fig. 8 is a detail view of the top or cap plate showing a modified arrangement of the guiding flange.

Corresponding parts in the several figures are denoted by like characters of reference.

A in the drawing designates the casing of a view-finder which is made, as usual, in the general shape of a right angled prism in the front of which is fitted an object lens 1 and in the rear of which lens, at an angle of 45 degrees, is arranged a reflecting mirror 2; the magnifying lens 3 being supported near the top of the casing.

The casing A is provided with a top or cap plate provided with the flanges 4 depending over the casing A and also provided upon its under face with an annular guiding flange 5 for support of the disk 6 having the view aperture 7, said disk being preferably but not necessarily of the circular shape seen in Fig. 5 of the drawings. It will be seen that the disk is preferably mounted adjacent the magnifying glass 3. The view aperture 7 is of rectangular shape, its sides being suitably proportioned according to the dimensions of the camera in connection with which the view-finder is used. The disk 6 is provided with a lever or handle 8 whereby it may be conveniently manipulated; and stops 9 are provided upon the casing A to limit the movement of the disk by contact with the lever or handle.

The casing of the view-finder is provided upon its inclined rear wall with a bracket 10 for the passage of a pin or bolt whereby it may be pivotally mounted upon the case of the camera.

It will be readily seen that when the camera is turned for the purpose of taking a picture with its long side edges in a horizontal or in a perpendicular position, as the case may be, the position of the disk having the view aperture may be correspondingly shifted, so that the image visible through the view aperture will include precisely that which will appear in the picture and no more, thus dispensing with the necessity of mentally eliminating portions of the image, the advantages of which will be equally apparent to professional operators and to amateurs.

The invention may also be advantageously applied to existing view-finders by resorting to the construction illustrated in Figs. 6 and 7 of the drawings. In said views is shown a casing B comprising a top or cap plate 11 provided with flanges 12 through which may be passed set screws 13 to secure the top plate in place and to enable the attachment to be readily removed. This top plate 11 is provided with the usual view aperture 14. Adapted to be fitted over the top plate 11 is a plate 15 of my attachment, having a circular opening 16 and a depending flange 17 forming a circular guide for the rotatable mounting of the disk 18, having a view aperture 19 of rectangular form. The disk is provided with a handle 20 adapted to engage the stop members 21 upon the plate 15. It will thus be seen that this attachment may be readily mounted upon an ordinary view-finder and secured thereto in any suitable manner. It will also be seen that the attachment itself consists of the plate 15 provided with means for rotatably supporting a disk-shaped member provided with the rectangular shaped opening, and the operating handle for manipulation between the stops 21.

As shown in Fig. 8, the guiding flange 22 of the disk need not necessarily depend from the top or cap plate but the same may extend from the flanges of the top or cap plate.

From the foregoing description taken in connection with the drawings hereto annexed the operation and advantages of this invention will be readily understood by those skilled in the art to which it appertains. The construction is simple and very inexpensive, and a view-finder equipped with the invention will exhibit a correctly circumscribed image of the picture that is to be taken.

Having thus described the invention what is claimed is:

1. The combination with a view finder including a casing supporting the lenses and reflector devices, of a plate having an aperture, means for detachably connecting said plate to said casing, a guide element carried by said plate adjacent to the aperture therein, a disk mounted for oscillation in said guide element and provided with a rectangular aperture constantly opposite the aperture in said plate, and means for oscillating said disk in said guide element.

2. In a view finder of the class described including a casing, lenses, and reflector devices, a plate having an aperture, means for detachably connecting said plate to said casing, a guide element connected to said plate and adjacent to said aperture, a disk mounted for oscillation in said guide element and provided with a rectangular aperture constantly opposite the aperture in said plate, stops spaced apart upon said plate and an arm connected to said disk and extending through the aperture of said plate and in position to alternately engage said stops.

In testimony whereof I have signed my name to this specification in the presence of two subscribing witnesses.

WAGGAMAN R. ELLIOTT.

Witnesses:
T. C. MACQUEENY,
JNO. TWOWLEY.